United States Patent
Dholakia et al.

(10) Patent No.: US 8,516,049 B2
(45) Date of Patent: Aug. 20, 2013

(54) ADMINISTERING INSTANT MESSAGING ('IM') CHAT SESSIONS

(75) Inventors: Ajay Dholakia, Cary, NC (US); William G. Pagan, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 171 days.

(21) Appl. No.: 12/135,676

(22) Filed: Jun. 9, 2008

(65) Prior Publication Data

US 2009/0307319 A1 Dec. 10, 2009

(51) Int. Cl.
G06F 15/16 (2006.01)

(52) U.S. Cl.
USPC .......................................... 709/204; 709/205

(58) Field of Classification Search
USPC .................................. 709/204–205
See application file for complete search history.

(56) References Cited

U.S. PATENT DOCUMENTS

| | | | |
|---|---|---|---|
| 6,434,559 B1 | 8/2002 | Lundberg et al. | |
| 7,051,049 B2 | 5/2006 | Samn | |
| 7,054,617 B2 | 5/2006 | Thomsen et al. | |
| 7,603,413 B1* | 10/2009 | Herold et al. | 709/204 |
| 2002/0174234 A1* | 11/2002 | Trovato et al. | 709/227 |
| 2003/0037112 A1* | 2/2003 | Fitzpatrick et al. | 709/205 |
| 2003/0078972 A1* | 4/2003 | Tapissier et al. | 709/204 |
| 2003/0225833 A1* | 12/2003 | Pilat et al. | 709/204 |
| 2004/0078444 A1* | 4/2004 | Malik | 709/206 |
| 2004/0255032 A1* | 12/2004 | Danieli | 709/229 |
| 2005/0256925 A1 | 11/2005 | Luo et al. | |
| 2005/0278426 A1* | 12/2005 | Blagg | 709/204 |
| 2006/0080432 A1 | 4/2006 | Spataro et al. | |
| 2006/0190829 A1 | 8/2006 | Zaner et al. | |
| 2006/0239275 A1 | 10/2006 | Zlateff et al. | |
| 2006/0242581 A1 | 10/2006 | Manion et al. | |
| 2007/0005704 A1* | 1/2007 | Heron et al. | 709/206 |
| 2007/0077993 A1 | 4/2007 | Midgley et al. | |
| 2007/0162588 A1 | 7/2007 | Wu et al. | |
| 2007/0174407 A1 | 7/2007 | Chen et al. | |
| 2007/0198647 A1 | 8/2007 | Lingafelt et al. | |
| 2007/0214052 A1 | 9/2007 | Kao | |
| 2009/0228944 A1* | 9/2009 | Bodlaender | 709/206 |

OTHER PUBLICATIONS

Bryan; SOSIMPLE—Self Organizing SIMPLE A Proposed P2P Instant Messaging System; College of William and Mary; Dec. 2003; pp. 1-16; CSCI 780; P2P and Grid Systems.

Ivanovic; Using Dialogue Acts to Suggest Responses in Support Services Via Instant Messaging; Proceeding of the 2006 Australasian Language Technology Workshop (ALTW2006); 2006; pp. 159-160; Department of Computer Science and Software Engineering, University of Melbourne.

\* cited by examiner

*Primary Examiner* — Chau Le

(74) *Attorney, Agent, or Firm* — Brandon C. Kennedy; Cynthia G. Seal; Biggers & Ohanian, LLP

(57) ABSTRACT

Computer-implemented methods, apparatus, and products for administering IM chat sessions including: identifying, by an IM module in dependence upon a merger policy, a plurality of IM participants to merge into a group IM chat session, the IM module providing IM services to one of the participants; and merging, by the IM module, the identified participants into the group IM chat session.

14 Claims, 3 Drawing Sheets

ADMINISTERING INSTANT MESSAGING ('IM') CHAT SESSIONS

BACKGROUND OF THE INVENTION

1. Field of the Invention

The field of the invention is data processing, or, more specifically, methods, apparatus, and products for administering instant messaging ('IM') chat sessions.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Users of modern computer system often participate in real-time communication with one another called instant messaging ('IM'). In current IM software one user must initiate a connection with other users for communication. That is, establishing a connection between one or more IM users currently requires user action, such as a selection of one or more users. Current IM software does not recommend users or automatically connect users for communication without such user interaction.

SUMMARY OF THE INVENTION

Computer-implemented methods, apparatus, and products for administering IM chat sessions including: identifying, by an IM module in dependence upon a merger policy, a plurality of IM participants to merge into a group IM chat session, the IM module providing IM services to one of the participants; and merging, by the IM module, the identified participants into the group IM chat session.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
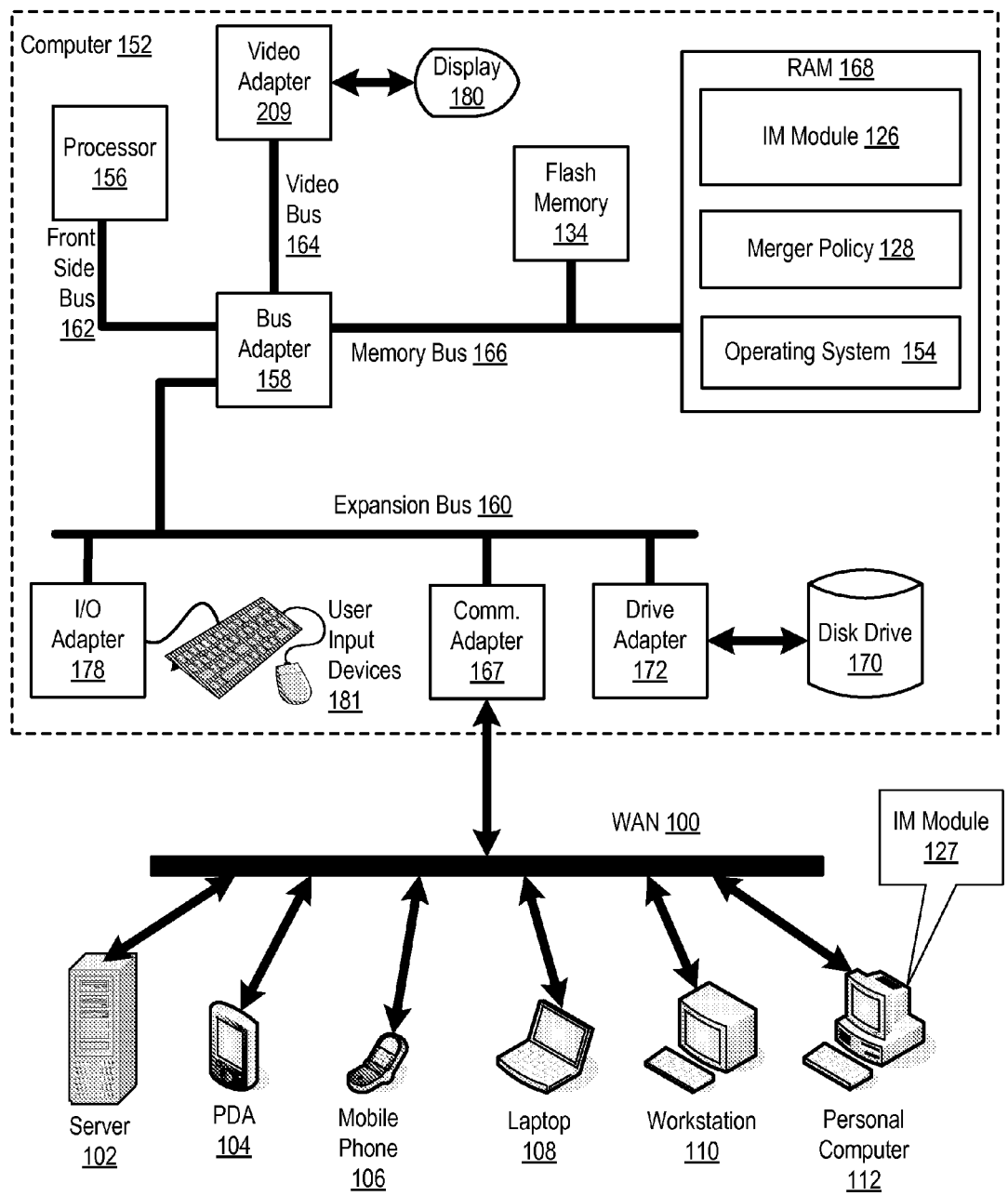
FIG. 1 sets forth a functional block diagram of an exemplary system for administering IM chat sessions according to embodiments of the present invention.

Exemplary methods, apparatus, and products for administering IM chat sessions in accordance with the present invention are described with reference to the accompanying drawings, beginning with FIG. 1. FIG. 1 sets forth a functional block diagram of an exemplary system for administering IM chat sessions according to embodiments of the present invention.

Instant messaging ('IM') is a form of real-time communication between two or more participants. An IM chat session is a connection established for such real-time communication between two or more participants. An IM chat session may be described as an 'individual' chat session, a chat session including only two participants, or as a 'group' chat session, a chat session including two or more participants. Although, early forms of IM software enabled only text communication between participants, IM software today now enables audio and video communication, among others. IM software typically establishes a chat session and administers chat traffic through one or more particular data application layer protocols such as the Session Initiation Protocol ('SIP'), SIP for Instant Messaging and Presence Leveraging Extensions ('SIMPLE'), Application Exchange ('APEX'), Presence and Instant Messaging Protocol ('PRIM'), the open XML-based Extensible Messaging and Presence Protocol ('XMPP'), Instant Messaging and Presence Service ('IMPS'), and so on as will occur to those of skill in the art. Examples of Instant messaging software include AOL's AIM, Jabber, eBuddy, Microsoft's Windows Live Messenger, Yahoo! Messenger, IBM Lotus Sametime, Skype, and so on as will occur to those of skill in the art.

The system of FIG. 1 includes a computer (152) connected for data communications to other computers through a wide area network (100). The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is an IM module (126), a set of computer program instructions capable of administering IM chat sessions according to embodiments of the present invention by identifying, by the IM module (126) in dependence upon a merger policy (128), a plurality of IM participants to merge into a group IM chat session and merging, by the IM module (126), the identified participants into the group IM chat session.

In the example of FIG. 1, the IM module (126) provides IM services to an IM participant. That is, the example IM module (126) of FIG. 1 may be capable of establishing IM chat sessions between participants, administering chat session communications between IM modules, and so on. An IM module may be a client-side set of computer program instructions such as the IM modules (126, 127) depicted in the example of FIG. 1. Alternatively an IM module capable of administering chat sessions in accordance with embodiments of the present invention may be a server-side set of computer program instructions, executing in the server (102) of FIG. 1 for example. In such an embodiment, participants may log into an IM chat service through the server-side IM module and participate in chat sessions established and administered by the server-side IM module. As yet another alternative, the IM module may be a client-side module that interacts with a server-side module, where the client-side module establishes IM connections through the server-side module and the server-side module maintains connection information and provides other server-side functions as will occur to those of skill in the art.

In the example of FIG. 1 a user, through operation of the IM module, may participate in an IM chat session with another user at any other computer executing an IM module, such as the personal computer (112) which also executes an IM module (127). Users capable of participating in an IM chat session through use of an IM module are described in this specification as a 'participants.' Such participants may be currently participating in an existing chat session or may only be available and capable of participating in such chat sessions.

A merger policy is a data structure including rules governing the merger of participants into a group IM chat session. Such a merger policy may be implemented as a table, linked list, array, XML document and so on as will occur to readers of skill in the art. Such a merger policy (128) may be established by an IM module (126) at the behest of a user. That is, a user may specify to the IM module the rules governing the merger of participants into a group IM chat session, either statically as part of a first execution of the of IM module or dynamically during execution of the IM module. An IM module for example, may provide a graphical user interface presenting one or more user-designated settings that are used to establish the merger policy. Such rules govern the merger of participants into a group IM chat session by indicating to the IM module (126) which participants to identify as participants to be merged into a group IM chat session.

Also stored in RAM (168) is an operating system (154). Operating systems useful for administering IM chat sessions according to embodiments of the present invention include UNIX™, Linux™, Microsoft XP™, Microsoft Vista™, AIX™, IBM's i5/OS™, and others as will occur to those of skill in the art. The operating system (154), IM module (126), and merger policy (128), in the example of FIG. 1, are shown in RAM (168), but many components of such software typically are stored in non-volatile memory also, such as, for example, on a disk drive (170) or in flash memory (134).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that administering IM chat sessions according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100) and other computers, such as the server (102), personal digital assistant ('PDA') (104), mobile phone (106), laptop (108), workstation (110), personal computer (112). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for administering IM chat sessions according to embodiments of the present invention include modems for wired dial-up communications, Ethernet (IEEE 802.3) adapters for wired data communications network communications, and 802.11 adapters for wireless data communications network communications.

The arrangement of servers, computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
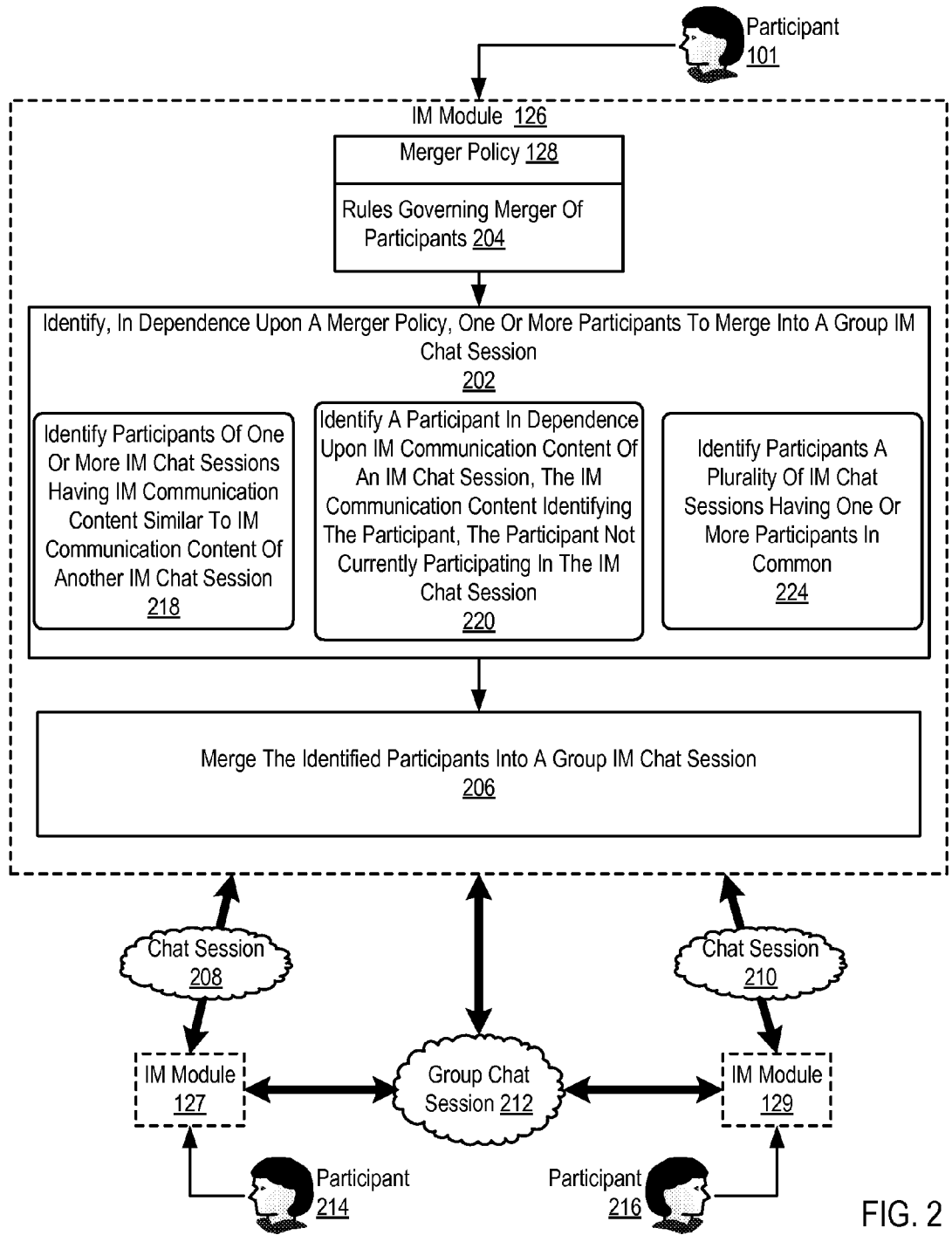
FIG. 2 sets forth a flow chart illustrating an exemplary method for administering IM chat sessions according to embodiments of the present invention.

For further explanation, FIG. 2 sets forth a flow chart illustrating an exemplary method for administering IM chat sessions according to embodiments of the present invention. The method of FIG. 2 is implemented by a computer, such as the computer (152) in the example of FIG. 1.

The method of FIG. 2 includes identifying (202), by an IM module (126) in dependence upon a merger policy (128), a plurality of IM participants (101, 214, 216) to merge into a group IM chat session and merging (206), by the IM module (126), the identified participants (101, 214, 216) into the group IM chat session (212). In the method of FIG. 2, the IM module (126) provides IM services to a participant (101) of one of the chat sessions (208,210). That is, the IM module is capable of establishing chat sessions between participants, administering chat session communication between the participants, and so on.

Identifying (202) a plurality of IM participants (101, 214, 216) to merge into a group IM chat session (212) may be carried out in different ways depending upon the implementation of the IM module (126), whether server-side or client-side. A server-side IM module (126) may maintain a list of all participants currently provided IM services by the server-side IM module (126), whether or not the participants are currently participating in a chat session. Such a list may also identify current chat sessions between participants. Identifying a plurality of IM participants by the server-side IM module (126) therefore may include finding the participants in the maintained list.

A client-side IM module may identify a plurality of participants by requesting, from other IM modules currently connected to the client-side IM module, connection information describing current connections of the other IM modules. Responses to such a request may identify connections between IM modules and therefore connections between participants associated with those client-side IM modules. Consider, as an example, that the IM module (126) is currently connected to the IM module (127). The IM module (126) may identify a plurality of participants by requesting from the IM module (127) connection information describing the IM module's (127) current connection. Consider also that the IM module (127) is connected to an IM module on each of the other computers (102, 104, 106, 108, 110). A response to the request from the IM module (126) may identify participants associated with IM modules having connections to the IM module (127).

A merger policy (128) is a data structure that includes rules governing the merger of participants into a group session. Such a data structure may be implemented as a table, an array, a linked list, an XML document, and so on as will occur to those of skill in the art. The rules (204) of the merger policy govern the merger of participants into a group session by indicating to an IM module (126) which participants (101, 214, 216) to identify as those participants to be merged into a group IM chat session (212). Such rules (204) may be configured to indicate many different participants as participants to merge into a group IM chat session as described below.

In the method of FIG. 2, identifying (202), by an IM module (126) in dependence upon a merger policy (128), a plurality of IM participants (101, 214, 216) to merge into a group IM chat session may include identifying (218) participants of one or more IM chat sessions having IM communication content similar to IM communication content of another IM chat session. IM communication content is data representing the communication between two or more participants. Such IM communication content may include text, video, or audio communications. The IM module may employ one or more typical data mining techniques to identify IM communication content similar to IM communication content of another IM chat session. Consider as an example two individual chat sessions (208, 210) each of which contains IM communications in the form of text. The participants of each chat session (208, 210) are discussing the topic of instant messaging technologies and the content of the text-based communications of two chat sessions include many similar and matching words such as "instant," "message," "messaging," "chat," buddy," "list," "contact," and so on. In such an example the IM module may identify the participants (214,216,101) of the chat sessions (208, 210) as participants to merge into a group IM chat session (212).

In the method of FIG. 2, identifying (202), by an IM module (126) in dependence upon a merger policy (128), a plurality of IM participants (101, 214, 216) to merge into a group IM chat session may also include identifying (220) a participant in dependence upon IM communication content of an IM chat session, the IM communication content identifying the participant, the participant not currently participating in the IM chat session. Consider for example, a chat session between participant (214) and participant (101) in which the contextual content, text for example, includes an identification of participant (216), repeated many times in a relatively few lines of text. Such an identification of a participant may be the participant's IM identification (a so-called 'screen-name' or 'handle'), a first name, a last name, a nickname, the participant's job title, and so on as will occur to those of skill in the art. In such an example, the IM module (126) may identify the participant (216) as a participant to merge into a group session with the other participants (214,101).

In the method of FIG. 2, identifying (202) a plurality of IM participants to merge into a group IM chat session may also include identifying (224) participants of a plurality of IM chat sessions having one or more participants in common. Consider as an example, a chat session (127) between participant (101) and participant (214) as well as a chat session between participant (101) and participant (216). In such an example, participant (101) is common to the two chat sessions (124, 129). That is, the IM module (126) may identify the participants (101, 214, 216) as participants of chat sessions (208, 210) having a participant (101) in common and as such may identify those participants (101, 214, 216) as participants to merge into a group IM chat session (212).

Figure 3:
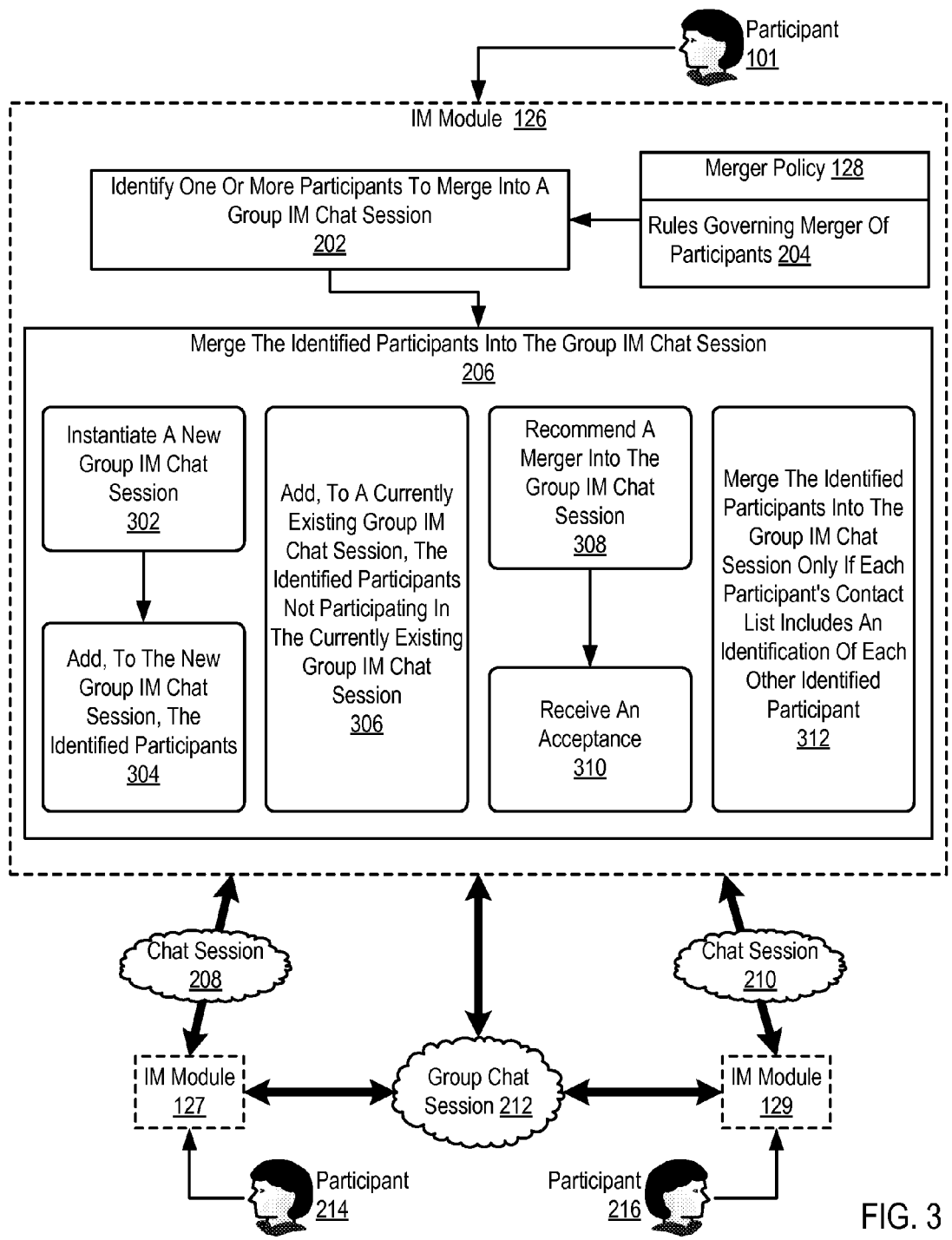
FIG. 3 sets forth a flow chart illustrating a further exemplary method for administering IM chat sessions according to embodiments of the present invention.

For further explanation, FIG. 3 sets forth a flow chart illustrating a further exemplary method for administering IM chat sessions according to embodiments of the present invention. The method of FIG. 3 is similar to the method of FIG. 2, in that the method of FIG. 3 is implemented by a computer (152 on FIG. 1). The method of FIG. 3 is also similar to the method of FIG. 2 in that the method of FIG. 3 includes identifying (202), by an IM module (126) in dependence upon a merger policy (128), a plurality of IM participants (101, 214, 216) to merge into a group IM chat session, the IM module (126) providing IM services to one of the participants (101); and merging (206), by the IM module (126), the identified participants (101, 214, 216) into the group IM chat session (212).

The method of FIG. 3 differs from the method of FIG. 2, however, in that in the method of FIG. 3, merging (206) the identified participants into the group IM chat session may be carried out by instantiating (302) a new group IM chat session and adding (304), to the new group IM chat session, the identified participants (101, 214, 216). In this way, participants of two individual chat sessions may be merged into a new group IM chat session. Instantiating (302) a new group IM chat session and adding the identified participants to the chat session may be carried out by establishing connections between the identified participants in accordance with an IM application protocol, such as XMPP or others as will occur to those of skill in the art. In the example of FIG. 1, the identified participants (214, 216, 101) may be merged into a group IM chat session (212) by instantiating (302) the chat session (212) and adding the participants (101, 214, 216) to the group IM chat session (212).

In the method of FIG. 3, merging (206) the identified participants into the group IM chat session may include adding (306), to a currently existing group IM chat session, the identified participants (101, 214, 216) not participating in the currently existing group IM chat session. In this way, participants of individual chat sessions or participants of existing group IM chat sessions may be merged into another existing group IM chat session.

In the method of FIG. 3, merging (206) the identified participants into the group IM chat session (212) may also include merging (312) the participants into the group IM chat session only if each participant's (101, 214, 216) contact list includes an identification of each other identified participant. A contact list is a data structure that includes a listing of identifications of participants. Participants identified in a particular participant's contact last may be referred to as a 'buddy' of that particular participant. In some embodiments of the present invention only contacts that are mutual buddies may be merged into a group IM chat session. In such an embodiment, for example, in order for the participants (214, 216, and 101) to be merged into the group IM chat session (212) the contact list of participant (214) must include an identification of the other participants (216, 101), the contact list of participant (216) must include an identification of the other participants (101, 214), and the contact list of participant (101) must include an identification of the other participants (214,216).

In the method of FIG. 3, merging (206) the identified participants into the group IM chat session (212) may also include recommending (308), to the participant (101) provided IM services by the IM module, a merger into the group IM chat session, the recommendation identifying one or more prospective participants of the group IM chat session; and receiving (312) an acceptance of the recommendation from the participant provided IM services by the IM module.

A recommendation for merger for a particular participant is information describing prospective participants with which the particular participant may merge in a group IM chat session. Such a recommendation may be implemented as graphical user interface ('GUI') notification, such as text in a pop-up GUI box, or an audible recommendation, a graphic notification in a contact list, and so on as will occur to those of skill in the art.

As mentioned above, a merger policy (128) is a data structure including rules (204) governing the merger of participants into a group IM chat session. In addition to such rules (204), the merger policy in the example of FIG. 3, may also include: identifications of prospective participants never to be included in a recommendation for merger; identifications of prospective participants expressly allowed to be included in a recommendation for merger; or identifications of prospective participants for which no recommendation for merger is necessary, but may be included automatically, in a merged group IM chat session.

In accordance with some embodiments of the present invention, an IM module (126) may be configured to recommend all identified participants except those identified in a merger policy as prospective participants never to be included in a recommendation for merger. Such identifications of prospective participants never to be included in a recommendation for merger create a blacklist of participants. In contrast, in accordance with other embodiments of the present invention, an IM module (126) may be configured to recommend no participants except those identified in the merger policy as prospective participants expressly allowed for inclusion in a recommendation for merger.

In accordance with other embodiments of the present invention, an IM module (126) may be configured such that if one of the participants identified (202) for merging (206) into a group IM chat session (212) is identified in a merger policy as a prospective participant for which no recommendation for merger is necessary, the IM module may automatically, without any recommendation, merge that participant into a group IM chat session. A user, then, may control participants capable of automatic merging into a group IM chat session, by managing identifications of prospective participants listed in the merger policy (128).

Exemplary embodiments of the present invention are described largely in the context of a fully functional computer system for administering IM chat sessions. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of administering instant messaging ('IM') chat sessions, the method comprising:

identifying, by an IM applicant module in dependence upon a merger policy, a plurality of IM participants to merge into a group IM chat session, the IM applicant module providing IM services to one of the participants, the merger policy comprising a set of rules governing the merger of participants into a group IM chat session, where the merger policy comprises identifications of prospective participants never to be included in a recommendation for merger, where identifying a plurality of IM participants to merge into a group IM chat session includes identifying, based on IM communication content of an IM chat session, as one of the plurality of IM participants to merge into the group IM chat session, a participant that is not in the IM chat session, the IM communication content including an identification of the participant; and merging, by the IM applicant module without consulting the participants, the identified participants into the group IM chat session.

2. The method of claim 1 wherein merging the identified participants into the group IM chat session further comprises:
instantiating a new group IM chat session; and
adding, to the new group IM chat session, the identified participants.

3. The method of claim 1 wherein merging the identified participants into the group IM chat session further comprises:
adding, to a currently existing group IM chat session, the identified participants not participating in the currently existing group IM chat session.

4. The method of claim 1 wherein merging the identified participants into the group IM chat session further comprises:
merging the participants into the group IM chat session only if each participant's contact list includes an identification of each other identified participant.

5. The method of claim 1 wherein the merger policy further comprises any of:
identifications of prospective participants expressly allowed to be included in a recommendation for merger; or
identifications of prospective participants for which no recommendation for merger is necessary, but may be included automatically, in a group IM chat session.

6. The method of claim 1 wherein identifying a plurality of IM participants to merge into a group IM chat session further comprises:
identifying participants of one or more IM chat sessions having IM communication content similar to IM communication content of another IM chat session.

7. The method of claim 1 wherein identifying a plurality of IM participants to merge into a group IM chat session further comprises:
  identifying participants of one or more IM chat sessions having one or more participants in common.

8. An apparatus for administering IM chat sessions, the apparatus comprising a computer processor, a computer memory operatively coupled to the computer processor, the computer memory having disposed within the computer memory computer program instructions that when executed by the computer processor cause the computer processor to:
  identify, by an IM application module in dependence upon a merger policy, a plurality of IM participants to merge into a group IM chat session, the IM application module providing IM services to one of the participants, the merger policy comprising a set of rules governing the merger of participants into a group IM chat session, where the merger policy comprises identifications of prospective participants never to be included in a recommendation for merger, where identifying a plurality of IM participants to merge into a group IM chat session includes identifying, based on IM communication content of an IM chat session, as one of the plurality of IM participants to merge into the group IM chat session, a participant that is not in the IM chat session, the IM communication content including an identification of the participant; and
  merge, by the IM application module without consulting the participants, the identified participants into the group IM chat session.

9. The apparatus of claim 8 wherein the computer instructions that when executed by the computer processor cause the computer processor to merge the identified participants into the group IM chat session further comprises:
  computer program instructions that when executed by the computer processor cause the computer processor to merge the participants into the group IM chat session only if each participant's contact list includes an identification of each other identified participant.

10. The apparatus of claim 8 wherein the computer program instructions that when executed by the computer processor cause the computer processor to identify a plurality of IM participants to merge into a group IM chat session further comprises:
  computer program instructions that when executed by the computer processor to identify participants of one or more IM chat sessions having IM communication content similar to IM communication content of another IM chat session.

11. The apparatus of claim 8 wherein the computer program instructions that when executed by the computer processor cause the computer processor to identify a plurality of IM participants to merge into a group IM chat session further comprises:
  computer program instructions that when executed by the computer processor cause the computer processor to identify participants of one or more IM chat sessions having one or more participants in common.

12. A computer program product for administering IM chat sessions, the computer program product comprising:
  a recordable, computer readable storage medium, where the medium is not a signal, having computer readable program code embodied therewith, the computer readable program code comprising: computer readable program code configured to:
  identify, by an IM application module in dependence upon a merger policy, a plurality of IM participants to merge into a group IM chat session, the IM application module providing IM services to one of the participants, the merger policy comprising a set of rules governing the merger of participants into a group IM chat session, where the merger policy comprises identifications of prospective participants never to be included in a recommendation for merger, where identifying a plurality of IM participants to merge into a group IM chat session includes identifying, based on IM communication content of an IM chat session, as one of the plurality of IM participants to merge into the group IM chat session, a participant that is not in the IM chat session, the IM communication content including an identification of the participant; and
  merge, by the IM application module without consulting the participants, the identified participants into the group IM chat session.

13. The computer program product of claim 12 wherein the computer readable program code configured to identify a plurality of IM participants to merge into a group IM chat session further comprises:
  computer readable program code configured to identify participants of one or more IM chat sessions having IM communication content similar to IM communication content of another IM chat session.

14. The computer program product of claim 12 wherein the computer readable program code configured to identify a plurality of IM participants to merge into a group IM chat session further comprises:
  computer readable program code configured to identify participants of one or more IM chat sessions having one or more participants in common.

* * * * *